United States Patent Office 2,968,656
Patented Jan. 17, 1961

2,968,656

14α,15α-EPOXIDO-Δ⁴-PREGNEN-21-OL-3,20-DIONE AND ESTERS THEREOF

Howard J. Ringold, Franz Sondheimer, and George Rosenkranz, Mexico City, Mexico, assignors to Syntex S.A., Mexico City, Mexico, a corporation of Mexico No Drawing. Original application Dec. 17, 1954, Ser. No. 476,073. Divided and this application Mar. 2, 1959, Ser. No. 799,398

Claims priority, application Mexico Dec. 23, 1953

2 Claims. (Cl. 260—239.55)

The present invention relates to novel cyclopentanophenanthrene derivatives and to a process for the production thereof. This application is a division of application Serial Number 476,073 filed December 17, 1954 now U.S. Patent 2,889,346.

More particularly, the present invention relates to the production of 15-hydroxy steroidal hormones, specifically the 15-hydroxy-Δ⁴-3-ketones of the pregnen series having the C-17 side chain of the cortical hormones, i.e., 15α and 15β-hydroxy-desoxycorticosterone and its esters, as well as to intermediates for the production thereof.

In our U.S. application Serial No. 471,098, filed November 24, 1954, there is disclosed the novel cortical hormones Δ⁴-pregnen-15,21-diol-3,20-dione and esters thereof (15-hydroxy-desoxycorticosterone and its esters) as well as a novel process for the production thereof from Δ¹⁶-pregnen-3α-ol-20-one.

In accordance with the present invention, we have discovered a novel process for the production of these compounds; as well as the novel intermediates Δ⁴,¹⁴-pregnadien-21-ol-3,20-dione and its esters; 14α,15α-epoxido-Δ⁴-pregnen-21-ol-3,20-dione and its esters; Δ⁴-pregnen-21-ol-3,15,20-trione and its esters; the novel 21-acetate of Δ⁴-pregnen-3,15,21-triol-20-one and the novel 21-acetate of 14α-bromo-Δ⁴-pregnen-15β,21-diol-3,20-dione.

The process of the present invention may be exemplified in part by the following equation:

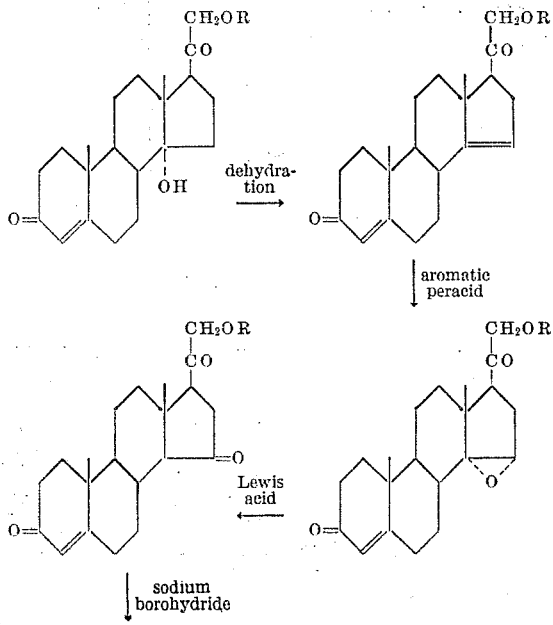

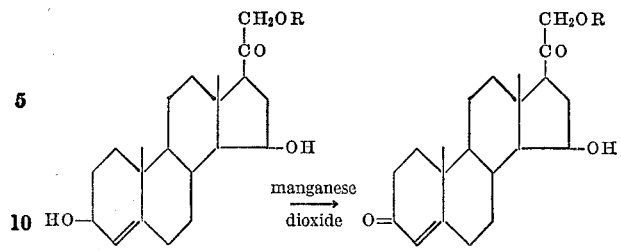

In the above equation R may represent hydrogen or R may represent the residue of any acid ordinarily used, as for example in the form of its anhydride or acyl chloride for the esterification of steroid alcohols. In general, these acids may be classified as carboxylic acids of less than about 10 carbon atoms and especially hydrocarbon carboxylic acids including carboxylic acid such as cyclopentyl propionic, aromatic acids such as benzoic and simple aliphatic acids such as acetic, propionic and butyric.

The starting compound 14-hydroxy-desoxycorticosterone may be made for example by the process of Meister et al. (Abstracts of Papers, 123rd Meeting, American Chemical Society, Los Angeles, California, page 50) and suitable esters thereof may be prepared by conventional acylation procedures utilizing acid anhydrides or acyl chlorides. These esters include those set forth in the definition of R previously referred to.

As indicated in the first step above, the free compound Δ⁴-pregnen-14,21-diol-3,20-dione or an ester, preferably a lower fatty acid ester such as the acetate, is dissolved in an organic solvent such as benzene and dehydrated by refluxing with p-toluenesulfonic acid. The product is then purified to give the corresponding ester or the free Δ⁴,¹⁴-pregnadiene-21-ol-3,20-dione. As may be understood, other dehydrating agents suitable for the dehydration of tertiary hydroxyl groups may be utilized rather than p-toluenesulfonic acid. If the esters were used, such as the acetate, this compound may be conventionally saponified to give the free compound.

For the second step of the above outlined process, the ester or free diene product of the first step, as for example the acetate of Δ⁴,¹⁴-pregnadiene-21-ol-3,20-dione, is dissolved in an organic solvent such as chloroform and thereafter there is added thereto slightly more than 1 molar equivalent of an aromatic peracid such as perbenzoic acid. The mixture is then kept standing for approximately one day at room temperature in darkness until titration indicated that about 1 mol of the per acid had been consumed. Upon purification there is produced a derivative, as the acetate of 14α,15α-epoxido-desoxycorticosterone which may be conventionally saponified to give the free compound.

For the third step of the above outlined process, the acetate of the previous step or other suitable ester or the free compound is dissolved in an organic solvent such as benzene and then mixed with a Lewis acid. An especially desirable Lewis acid is an ether solution of boron trifluoride. Instead of boron trifluoride, however, other Lewis acids can be used such as ferric chloride or stannic chloride. The solution is kept for a short period of time, as for example 30 minutes, at a temperature slightly above room temperature, i.e., of the order of 22° C. and thereafter washed, dried and evaporated under a vacuum. Crystallization from a suitable organic solvent such as ether gave the corresponding 15-keto-desoxycorticosterone derivative, as for example the acetate (acetate of Δ⁴-pregnen-21-ol-3,15,20-trione). Here again if the compound utilized for this step was the ester such as the acetate, conventional saponification afforded the free 15-keto-desoxycorticosterone.

For the fourth and fifth steps of the previously indicated process the derivative of 15-keto-desoxycorticosterone, as for example the acetate, is dissolved in a suitable organic solvent such as anhydrous tetrahydrofurane and stirred for the period of the order of three hours at room temperature after the addition of approximately 2 molar equivalents of sodium borohydride in water. The excess of sodium borohydride is then decomposed, as with acetic acid, and the mixture evaporated to dryness under reduced pressure. The crude product thus obtained is the corresponding derivative such as the 21-acetate of $\Delta^4$-pregnen-3,15,21-triol-20-one and this crude product could be used directly for the final step of the process by dissolving the same in organic solvent such as chloroform and mixing the solution with recently precipitated magnesium dioxide. The mixture is then stirred for approximately one day at room temperature resulting in the selective oxidation of the 3-hydroxy group to give the 21-acetate of $\Delta^4$-pregnen-15$\alpha$,21-diol-3,20-dione. Here again, the acetate could be conventionally saponified to give the corresponding free compound.

Starting with the intermediate $\Delta^{4,14}$-pregnadiene-21-ol-3,20-dione derivative, previously set forth as resulting from the first step of the aforementioned procedure, the 15$\beta$-hydroxy-desoxycorticosterone derivative could be prepared in accordance with the following equation:

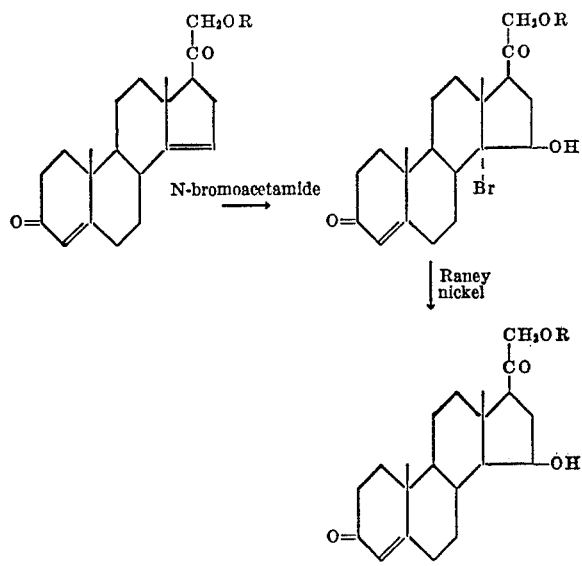

In the above equation R has the same meaning as heretofore set forth.

In practicing the process above outlined, the derivative of $\Delta^{4,14}$-pregnadiene-21-ol-3,20-dione such as the acetate is dissolved in glacial acetic acid and the elements of hypobromous acid added thereto as for example by reaction with N-bromacetamide. For this purpose the glacial acetic acid solution is mixed with sodium acetate trihydrate and N-bromoacetamide and the resultant solution is kept standing for a period of time of the order of 90 minutes at a temperature below room temperature, as for example 16° C. and then allowed to stand for a further period of the order of 30 minutes at room temperature. The steroid is then precipitated with water and the precipitate washed and dried. Crystallization from a suitable organic solvent such as mixture of ether-pentane produced the acetate of 14$\alpha$-bromo-$\Delta^4$-pregnen-15$\beta$,21-diol-3,20-dione.

A derivative of 14$\alpha$-bromo-$\Delta^4$-pregnen-15$\beta$-21-diol-3,20-dione thus produced, such as the acetate, is then treated with Raney nickel in acetone which had been previously deactivated by heating for one hour in the acetone. The mixture is refluxed for a substantial period of time as of the order of four hours, cooled, filtered and the nickel washed with additional acetone. The combined solutions are then concentrated and the residue recrystallized as from a suitable solvent such as a mixture of acetone-hexane to prepare the corresponding derivative as the acetate of $\Delta^4$-pregnen-15$\beta$-21-diol-3,20-dione. Saponification by conventional methods gave the corresponding $\Delta^4$-pregnen-15$\beta$-21-diol-3,20-dione.

The following specific examples serve to illustrate but are not intended to limit the present invention:

*Example I*

9.5 g. of p-toluenesulphonic acid monohydrate was added to a solution of 9.5 g. of the acetate of $\Delta^4$-pregnene-14,21-diol-3,20-dione in 600 cc. of hot benzene and the mixture was refluxed for 3 hours. After cooling, the solution was washed with aqueous sodium bicarbonate solution and water, dried over sodium sulphate and concentrated under vacuum. The residue crystallized from ether, thus giving 8.3 g. of the acetate of $\Delta^{4,14}$-pregnadien-21-ol-3,20-dione with a M.P. of 141–144° C., $[\alpha]_D + 131°$ (acetone).

Saponification of the acetate with 1% methanolic potassium hydroxide for 1 hour at 0° C. under an atmosphere of nitrogen afforded the free $\Delta^{4,14}$-pregnadien-21-ol-3,20-dione.

*Example II*

0.47 g. (1.25 molar equivalents) of perbenzoic acid dissolved in 8.4 cc. of chloroform was added to 1.0 g. of the acetate of $\Delta^{4,14}$-pregnadien-21-ol-3,20-dione previously dissolved in 25 cc. of chloroform. The mixture was kept standing for 17 hours at room temperature in a dark place. Titration indicated that 1.0 mol of the peracid had been consumed. The solution was washed with aqueous sodium bicarbonate solution and water, dried over sodium sulphate and evaporated under vacuum. The crude product crystallized from acetone-hexane to give 800 mg. of the acetate of 14$\alpha$,15$\alpha$-epoxido-desoxycorticosterone with a M.P. of 180–183° C. The analytical sample had a M.P. of 185–188° C., $[\alpha]_D + 147°$ (chloroform).

Saponification with 1% methanolic potassium hydroxide for 1 hour at 0° C. under an atmosphere of nitrogen gave the free 14$\alpha$,15$\alpha$-epoxido-desoxycorticosterone.

*Example III*

100 mg. of the acetate of 14$\alpha$,15$\alpha$-epoxido-desoxycorticosterone was dissolved in 10 cc. of anhydrous benzene and then mixed with three drops of boron trifluoride etherate. The solution was kept for 30 minutes at 22° C., washed with aqueous sodium bicarbonate solution and water, dried over sodium sulphate and evaporated under vacuum. Crystallization from ether yielded the acetate of 15-keto-desoxycorticosterone (acetate of $\Delta^4$-pregnen-21-ol-3,15,20-trione) with a M.P. of 161–164° C.

Saponification with 1% methanolic potassium hydroxide for 1 hour at 0° C. under an atmosphere of nitrogen afforded the free 15-keto-desoxycorticosterone.

*Example IV*

100 mg. (2 molar equivalents) of sodium borohydride in 0.4 cc. of water was added to a solution of 1 g. of the acetate of 15-keto-desoxycorticosterone in 40 cc. of anhydrous tetrahydrofurane and the mixture was stirred for 3 hours at room temperature. Acetic acid was cautiously added to decompose the excess of hydride and the mixture was evaporated to dryness under reduced pressure and at a temperature below 30° C. The residue was diluted with much water, filtered and the precipitate was washed with water and dried.

The crude product was dissolved in 100 cc. of chloroform, mixed with 10 g. of recently precipitated manganese dioxide and the mixture was stirred for 20 hours at room temperature. After filtration, the solution was evaporated to dryness under vacuum, thus giving the 21 acetate of $\Delta^4$-pregnene-15$\alpha$,21-diol-3,20-dione, which was purified by crystallization from acetone-hexane.

Saponification with 1% methanolic potassium hydroxide for 1 hour at 0° C. under an atmosphere of nitrogen gave the free $\Delta^4$-pregnene-15$\alpha$,21-diol-3,20-dione.

*Example V*

0.2 g. of the acetate of $\Delta^{4,14}$-pregnadien-21-ol-3,20-dione was dissolved in 5 cc. of glacial acetic acid and 1.25 cc. of water. The solution was cooled to 16° C. and then mixed with 82 mg. of sodium acetate trihydrate and 82 mg. (1.1 molar equivalents) of N-bromoacetamide. The solution was kept standing for 90 minutes at 16° C. and then for a further 30 minutes at room temperature. Water was added to precipitate the steroid, the gummy precipitate was washed and dried under vacuum at room temperature. Crystallization from ether-pentane afforded the acetate of 14$\alpha$-bromo-$\Delta^4$-pregnene-15$\beta$,21-diol-3,20-dione.

*Example VI*

1.0 g. of the acetate of 14$\alpha$-bromo-$\Delta^4$-pregnene-15$\beta$,21-diol-3,20-dione was added to a suspension of Raney nickel in 50 cc. of acetone. The Raney nickel had been previously deactivated by heating for 1 hour in the solvent. The mixture was refluxed for 4 hours, cooled, filtered, the nickel was washed with more acetone and the combined acetone solution was concentrated under vacuum. Crystallization of the residue from acetone-hexane yielded the acetate of $\Delta^4$-pregnene-15$\beta$,21-diol-3,20-dione. Saponification with 1% methanolic potassium hydroxide for 1 hour at 0° C. under an atmosphere of nitrogen gave $\Delta^4$-pregnene-15$\beta$,21-diol-3,20-dione.

We claim:

1. A new compound selected from the group consisting of 14$\alpha$,15$\alpha$-epoxido-$\Delta^4$-pregnen-21-ol-3,20-dione and esters of hydrocarbon carboxylic acids of less than 10 carbon atoms thereof.

2. The acetate of 14$\alpha$,15$\alpha$-epoxido-$\Delta^4$-pregnen-21-ol-3,20-dione.

No references cited.